G. MILLER.
Bee-Hives.
No. 143,295.  Patented September 30, 1873.
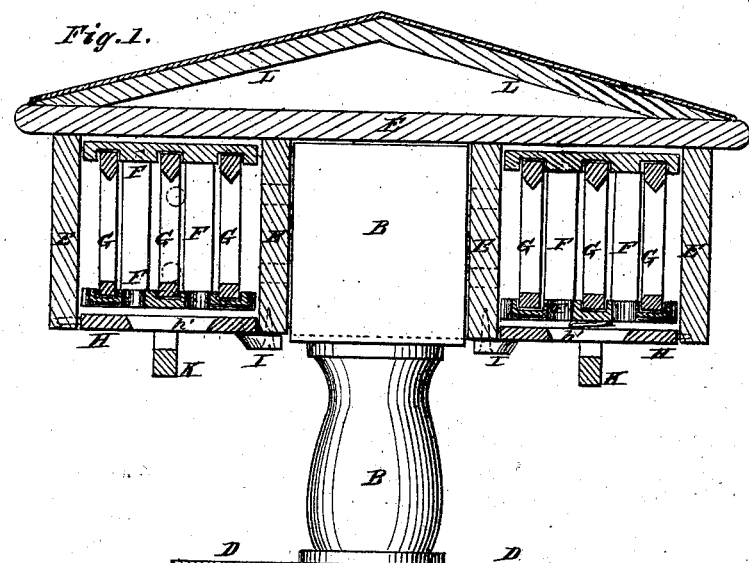
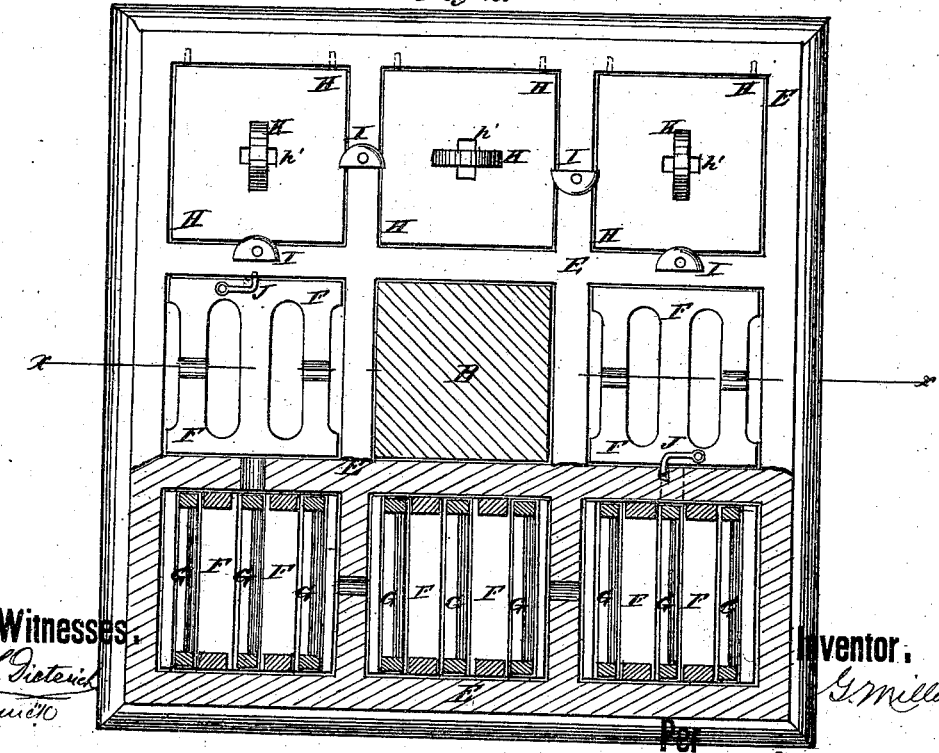
Witnesses:  Inventor:

UNITED STATES PATENT OFFICE.

GEORGE MILLER, OF BATTLE GROUND, WASHINGTON TERRITORY.

IMPROVEMENT IN BEE-HIVES.

Specification forming part of Letters Patent No. 143,295, dated September 30, 1873; application filed May 31, 1873.

*To all whom it may concern:*

Be it known that I, GEORGE MILLER, of Battle Ground, in the county of Clark and Territory of Washington, have invented a new and useful Improvement in Bee-Hives, of which the following is a specification:

Figure 1 is a vertical section of my improved bee-hive taken through the line $x$ $x$, Fig. 2. Fig. 2 represents the under side of the upper part of my improved hive.

Similar letters of reference indicate corresponding parts.

My invention has for its object to furnish an improved bee-hive (called by me the Cottage Bee-House) which shall be simple in construction and convenient in use, enabling the honey to be readily removed without injuring the bees or getting them mixed with the honey, and which will better protect the bees from their numerous enemies than hives constructed in the ordinary manner. The invention consists in an improved bee-hive formed of a number of cells, provided with a roof, and supported by a single shaft or post from a base; in the main frames, the detachable single frames, and the plates, in combination with the cells of the hive; and in the combination of the water-vessel and cover with the base and post of the hive, as hereinafter fully described.

A is the foundation or base of the hive, which should be of such a size as to support the hive and prevent it from being blown or pushed over or otherwise overturned. In the center of the base or foundation A is formed a socket to receive the lower end of the post B. Around the foot of the post B is placed a vessel, C, to receive water to prevent ants and other insects from crawling up the said posts B. Above the vessel C, and connected with its inner walls, is placed a cover, D, to prevent the bees, when heavily loaded, from dropping into the vessel C. E is the upper part of the hive, in the center of which is formed a socket to receive and fit upon the upper end of the post B. The part E is divided up into any desired number of cells or compartments. Holes should be made in the partition-walls of the cells, so that when smoke is driven into one or more of the cells the bees may escape from said cells into the others. In each of the cells are placed an upper and a lower plate, connected at their side edges by two or more bars, thus forming two or more permanent or main frames, F. In the top and bottom plates of the main frames F, and midway between the side bars of said main frames, are formed grooves to receive the top and bottom bars of the single or detachable frames G, so that the said frames and the comb attached to them may be drawn out conveniently and without breaking or otherwise injuring said comb, or the comb in the main frames. The bottom plates of the main frames F are slotted, and their side edges are notched, as shown in Figs. 1 and 2, to give free passage-ways to the bees. The lower or open ends of the cells are closed with plates H, which are secured in place by buttons I pivoted to the lower edges of the partition-walls of the cells. The buttons I are made semicircular in form, and of such a size as to overlap and support the edges of two adjacent plates, H. The semicircular form of the buttons I enables them to be turned to release one plate without releasing the other. The frames F G are supported while inserting and detaching the plates H by one or more hooks, J, pivoted to them, and which hook into holes formed in the partition-walls of the cells. The plates H may be further supported by dowel-pins attached to one of their edges, and which enter holes in the side wall of the cells. In the middle part of the plates H is formed a short slot, $h'$, transversely to the plane of the frames F G, and in the lower sides of the side parts of the lower plate of the frames F are formed transverse grooves, so that the bees may enter and leave the cells conveniently. To the middle part of the under side of the plates H, and transversely with the slots $h'$ are attached semicircular projections K, notched in their upper edges directly beneath the slot $h'$ in the plates H. The notched projections K thus serve as resting-places for the bees in entering and leaving the hive. The part or cells E are covered with a roof, L, rising to a ridge in the center and sloping in both directions. The gables of the roof L should be left open, and the hive should be arranged with its open gables turned to the east and west to receive the full benefit of the rising sun.

When the hive is made large each swarm should have a certain number of cells appropriated to it, which cells should be isolated from the other adjacent cells by closing the holes in the partition-walls separating said cells from the others.

Having thus described my invention, I claim as new and desire to secure by Letters Patent—

1. An improved bee-hive consisting of a number of cells, E, provided with a roof, L, and supported upon a single shaft, B, from a base, A, substantially as herein shown and described.

2. The main frames F, detachable single frames G, and plates H $h'$ K, in combination with the cells E of the hive E L B A, substantially as herein shown and described.

3. The combination of the water-vessel C and cover D with the base A and post B of the hive A B E L, substantially as herein shown and described.

GEORGE MILLER.

Witnesses:
W. A. BATTERSBY,
GAY HAYDEN.